(12) United States Patent
Wenzinger et al.

(10) Patent No.: US 8,601,581 B2
(45) Date of Patent: *Dec. 3, 2013

(54) MALWARE AUTOMATED REMOVAL SYSTEM AND METHOD

(75) Inventors: Michael Wenzinger, Savage, MN (US); Michael Sherwood, Eden Prairie, MN (US)

(73) Assignee: BBY Solutions, Inc., Richfield, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/602,380

(22) Filed: Sep. 4, 2012

(65) Prior Publication Data

US 2012/0331552 A1 Dec. 27, 2012

Related U.S. Application Data

(63) Continuation of application No. 11/825,168, filed on Jul. 5, 2007, now Pat. No. 8,266,692.

(60) Provisional application No. 60/818,809, filed on Jul. 5, 2006.

(51) Int. Cl.
*G06F 21/00* (2013.01)

(52) U.S. Cl.
USPC ............ 726/22; 726/24; 713/2; 717/168; 717/170; 717/173

(58) Field of Classification Search
USPC ............ 726/22, 24; 713/2; 717/168, 170, 173
See application file for complete search history.

(56) References Cited

U.S. PATENT DOCUMENTS

| | | | | |
|---|---|---|---|---|
| 5,559,960 | A * | 9/1996 | Lettvin | 726/24 |
| 6,170,055 | B1 * | 1/2001 | Meyer et al. | 713/2 |
| 6,212,635 | B1 * | 4/2001 | Reardon | 713/165 |
| 6,230,285 | B1 * | 5/2001 | Sadowsky et al. | 714/14 |
| 6,993,649 | B2 * | 1/2006 | Hensley | 713/2 |
| 7,137,034 | B2 * | 11/2006 | Largman et al. | 714/23 |
| 7,146,640 | B2 * | 12/2006 | Goodman et al. | 726/16 |
| 7,305,714 | B2 * | 12/2007 | Hamaguchi et al. | 726/34 |
| 7,353,428 | B2 * | 4/2008 | Cheston et al. | 714/38.13 |
| 7,370,188 | B2 * | 5/2008 | Rothman et al. | 713/2 |
| 7,448,034 | B2 * | 11/2008 | Anderson et al. | 717/176 |
| 7,549,055 | B2 * | 6/2009 | Zimmer et al. | 713/188 |
| 7,591,018 | B1 * | 9/2009 | Lee | 726/24 |
| 7,657,941 | B1 * | 2/2010 | Zaitsev | 726/24 |
| 7,680,957 | B1 * | 3/2010 | Ketterhagen et al. | 709/246 |
| 7,734,945 | B1 * | 6/2010 | Levidow et al. | 714/3 |
| 7,865,878 | B2 * | 1/2011 | Weiner et al. | 717/122 |
| 7,877,809 | B1 * | 1/2011 | Sutton et al. | 726/24 |
| 7,930,531 | B2 * | 4/2011 | Chow et al. | 713/2 |
| 8,037,290 | B1 * | 10/2011 | Stutton | 713/2 |
| 2004/0034794 | A1 * | 2/2004 | Mayer et al. | 713/200 |
| 2005/0015606 | A1 * | 1/2005 | Blamires et al. | 713/188 |

(Continued)

*Primary Examiner* — Edan Orgad
*Assistant Examiner* — James Turchen
(74) *Attorney, Agent, or Firm* — Beck & Tysver PLLC (57) ABSTRACT

The present invention automates the operation of multiple malware removal software products using a computerized system that systematically operates the multiple selected software products. These products are operated them in a customized "Safe Mode" using a shell that is different than the computer's other shell environments. Unlike the ordinary Safe Modes shells, the Custom Safe Mode prevents malware from functioning that ties itself to the normal shell, such as the Windows Explorer shell. In addition, the Custom Safe Mode allows the automation of tasks beyond that which is available under the standard command line shell.

16 Claims, 4 Drawing Sheets

(56) References Cited

U.S. PATENT DOCUMENTS

| | | | |
|---|---|---|---|
| 2005/0138427 A1* | 6/2005 | Cromer et al. | 713/201 |
| 2005/0193188 A1* | 9/2005 | Huang | 713/1 |
| 2005/0283640 A1* | 12/2005 | Cheston et al. | 714/4 |
| 2006/0075486 A1* | 4/2006 | Lin et al. | 726/20 |
| 2006/0236108 A1* | 10/2006 | Andrews | 713/170 |
| 2006/0294105 A1* | 12/2006 | Rosenan et al. | 707/9 |
| 2007/0113062 A1* | 5/2007 | Osburn et al. | 713/1 |
| 2007/0261118 A1* | 11/2007 | Lu | 726/24 |
| 2008/0282351 A1* | 11/2008 | Khilnani et al. | 726/24 |

\* cited by examiner

MALWARE AUTOMATED REMOVAL SYSTEM AND METHOD

CROSS REFERENCE TO RELATED APPLICATION

This application is a continuation of U.S. patent application Ser. No. 11/825,168, filed Jul. 5, 2007, which in turn claimed the benefit of U.S. Provisional Patent Application Ser. No. 60/818,809, filed Jul. 5, 2006, all of which are incorporated by reference in their entireties.

FIELD OF THE INVENTION

The present invention relates to software for the removal of computer viruses, worms, Trojan horses, spyware, dishonest adware, and other malicious and unwanted software ("malware").

BACKGROUND OF THE INVENTION

While many programs exist that can remove malware, none of these programs is capable of removing as many malware infestations as a combination of products. Consequently, the best industry practice requires the operation of multiple malware removal software products. This is currently a difficult, time-consuming process, which is often rendered ineffective by failure to prevent malware from being active during the malware removal process.

SUMMARY OF THE INVENTION

The present invention automates the operation of multiple malware removal software products. In addition, the present system improves the performance of these software products by operating them in a "Custom Safe Mode" shell. Unlike the ordinary safe modes, the Custom Safe Mode prevents malware from functioning that ties itself to the normal computer shell, such as the Windows Explorer shell. In addition, the Custom Safe Mode allows the automation of tasks beyond that which is available under the standard command line shell.

DETAILED DESCRIPTION OF THE INVENTION

Operating Modes

The present invention automates proven manual malware removal processes in order to minimize the total time and maximize the success rate of removal. The automation allows multiple third-party malware removal software programs to be run in a fraction of the time normally required. The present invention operates by transitioning between two different operating modes of a personal computer system.

Figure 1:
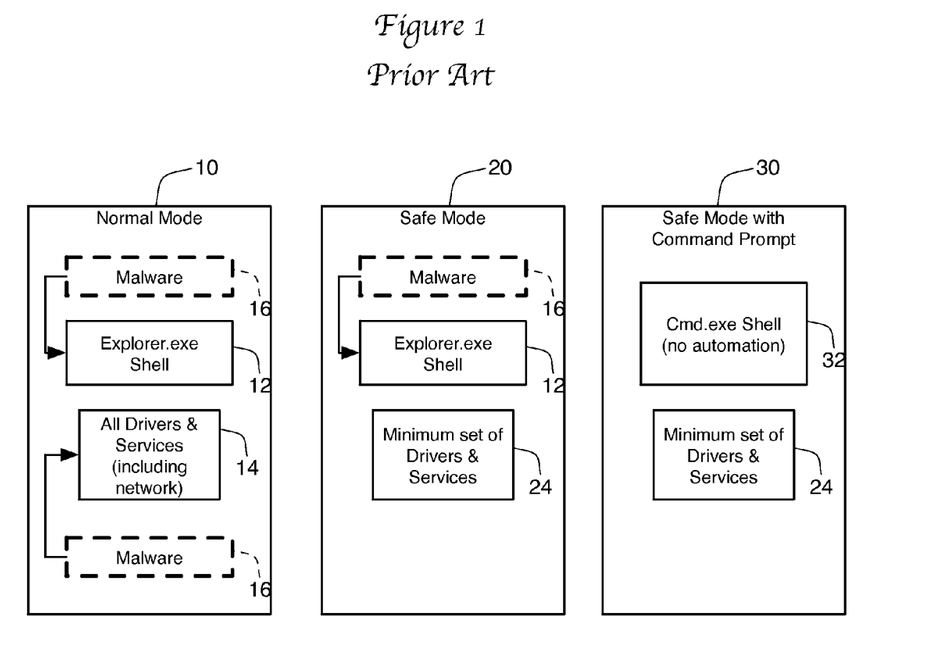
FIG. 1 is a schematic drawing of operating modes in a personal computer.

FIG. 1 shows three standard modes available to a personal computer operating a Windows-type operating system provided by Microsoft Corporation. The Normal Mode 10 uses the Windows Explorer.exe shell to provide the user interface. This is the mode used for normal operation of the computer system. As part of this mode, the system operates with a full complement of drivers and services 14, include those services necessary for network and Internet connectivity. In some circumstances, a computer system can be infected with malware 16. It is possible to run malware removal software in the Normal Mode and successfully remove the malware infestation. Unfortunately, however, it can often be difficult to remove malware that is currently operating or running. Thus, many malware programs 16 are designed to operate whenever the normal drivers and services are loaded in the normal operating mode. Consequently, these malware programs are running whenever the computer is in Normal Mode 10, thereby confounding the malware removal programs.

As a consequence, many malware removal program developers recommend that their software be run while the computer is in Safe Mode 20. In this mode 20, the computer starts with only a minimum set of drivers and services 14. This reduces the functionality of the computer, eliminating capabilities such as network and Internet connectivity. As a result, Safe Mode 20 is not appropriate for normal computer operation. The benefit of Safe Mode is that it is easier to isolate problems because many non-core services and drivers are disabled. By limiting the number of components operating in conjunction with the Explorer shell 12, Safe Mode 20 reduces the number of malware programs 16 that are operating. As a consequence, malware removal programs will have an easier time of removing these malware programs 16. Unfortunately, some malware programs 16 are triggered off of the operation of the Explorer.exe shell 12 itself, thereby starting whenever that shell 12 starts up. Since this shell 12 is run whenever the computer operates in either Normal Mode 10 or Safe Mode 20, the malware 16 will also always be running in these modes 10, 20.

A third mode 30 is known as Safe Mode with Command Prompt, or Command Mode 30. In this mode 30, the same minimum set of drivers and services 22 are operating. Instead of operating the Explorer.exe shell 12 to provide the user interface, the Command Mode 30 uses the Cmd.exe shell 32. This shell 32 provides a simplified, command line user interface for users. Although this shell is more difficult for users to use, the Cmd.exe 32 shell has the benefit of not launching malware programs 16 that are programmed to automatically launch along with Explorer.exe 12. Of course, because the Cmd.exe shell 32 is well known, it is possible that malware developers can trigger their malware 16 to launch along with the Cmd.exe shell 32.

Figure 2:
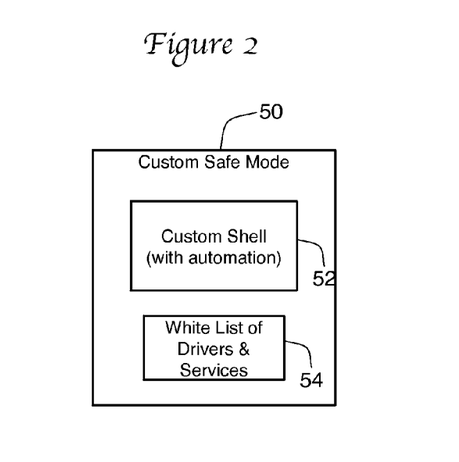
FIG. 2 is a schematic drawing of the Custom Safe Mode used by the present invention.

FIG. 2 shows a fourth operating mode known as the Custom Safe Mode 50 that is used by the present invention. This mode operates with a custom shell 52 that is designed to operate the method set forth below. This mode 50 operates with a minimum set of drivers and services 54 that is created by starting with the Safe Mode set 22 and then systematically killing all operating processes that are not found in a white list of allowed processes. By creating a new shell 52, this mode 50 prevents the loading of those malware programs 16 that are triggered upon the loading of a known shell. All that is required is that the safe shell 52 has a name that is different than the known names of the shells 12, 32 provided with the operating system. Furthermore, by eliminating all processes that are not found in the white list of needed processes 54, the Custom Safe Mode 50 further prevents the loading and operation of malware programs 16 that are loaded using other mechanisms (such as by alteration of the system registry values).

Computer System

Figure 3:
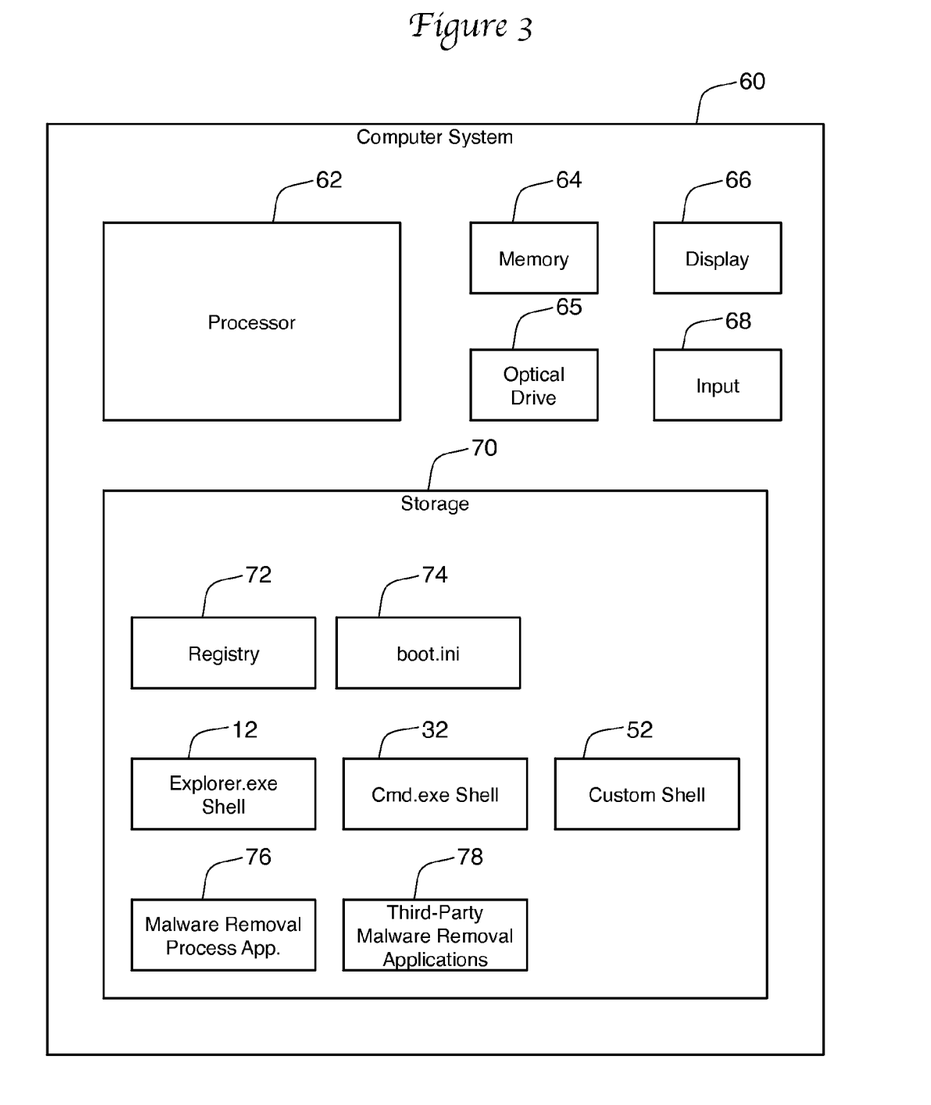
FIG. 3 is a schematic drawing of a computer system used by the present invention.

The present invention operates on a computer system 60 such as that shown in FIG. 3. The computer system 60 has a processor 62, volatile random access memory 64, an optical drive 65, a display 66, and one or more input devices 68, as are commonly used by all computer systems 60. In addition, the computer system 60 has non-volatile memory or storage 70 such as a computer hard drive or flash memory. The storage 70 is used to store applications and other programs such as the three shell programs 12, 32, and 52 described in FIGS. 1 and 2. Storage 70 also contains user files and data (not shown), and system data such as the registry 72 used by modern Windows operating systems. The storage 70 also contains the boot.ini file 74, which is used by some Windows operating systems to configure the boot loader program (such as the NTLDR program used by Windows NT and XP). Other operating system store boot configuration data separately, such as the Boot Configuration Data (or BCD) database used in the Windows Vista operating system. The boot configuration data 74 is used to store information about how the computer system 60 should boot. To change boot behavior, the boot configuration system can be altered. However, to prevent accidental changes to the boot configuration, the configuration data 74 is generally protected in some way. In systems using the boot.ini file 74, the file is stored using the following file attributes: system, hidden, read-only. Before the file 74 can be altered, the attributes must be changed so that the file 74 is no longer read-only.

The present invention is initiated by running a malware removal process application program 76 that is also stored in storage 70. This application program 76 is generally initiated in Normal Mode 10 through the Explorer shell 12. When run, the application 76 is designed to automate the process of running multiple, third-party malware removal programs 78 in the customer Safe Mode 50 of the computer system 60. These applications 78 are also stored in the storage 70 of computer system 60. Although the applications 76 and 78 are generally run from storage 70, they can be copied to storage 70 from a removable optical disk found in drive 65, as explained below. After use, these applications 76, 78 can then be deleted from storage 70 as desired by the user of the present invention. It is possible to program the custom shell 52 to operate both as the custom shell 52 and the malware removal process application 76, thereby allowing a single file/program to perform the functions of both components 52, 76.

Overall Process

Figure 4:
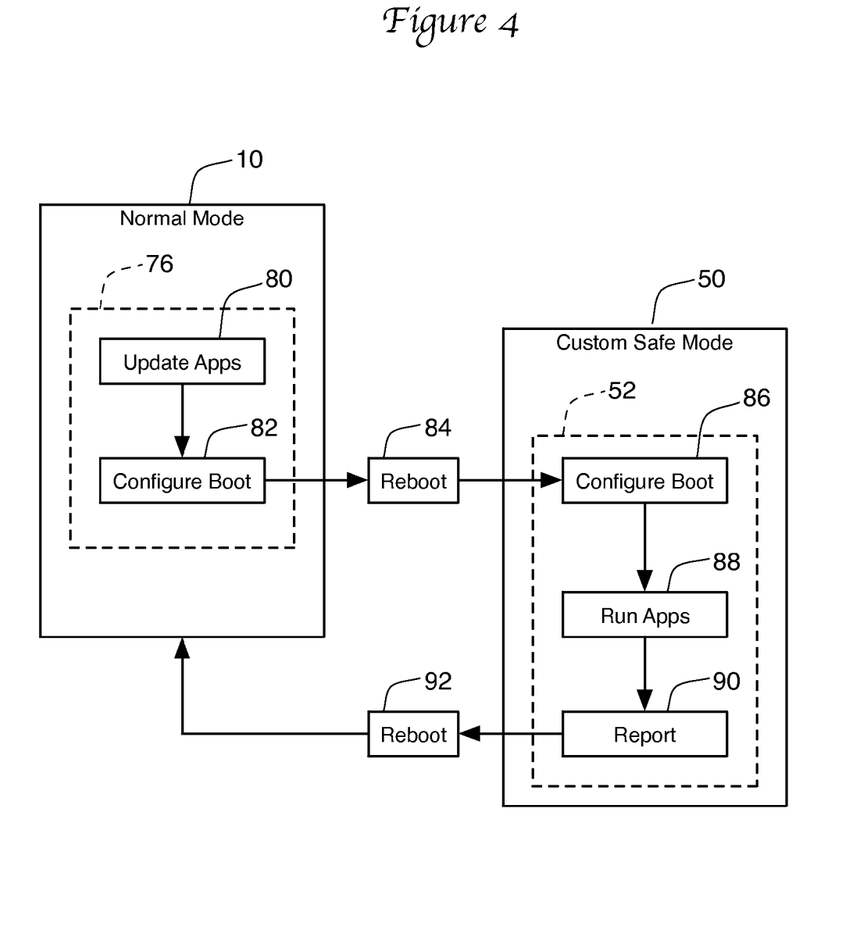
FIG. 4 is a schematic drawing showing a summary of the steps used by the present invention along with the operating modes used by each step.

A summary of the overall operation of the process triggered by running application program 76 is shown in FIG. 4. The first step 80 is to update these malware programs while the computer 60 still has the Internet access that is available in Normal Mode 10. This updating generally occurs by contacting web sites or ftp sites maintained by the developer of the malware program. Once updated, the application 76 at step 82 configures the boot data (such as boot.ini 74) so that the system will reboot into the Custom Safe Mode 50. The application 76 then triggers a reboot (step 84) to re-start the computer system 60 in Custom Safe Mode 50.

Once in this mode, the custom shell 52 is initiated. The purpose of the shell is to automate the running of multiple malware removal programs 78 in Safe Mode 50. Consequently, the shell 52 need not be a general-purpose user interface allowing the launching of any program, but can instead directly contain the programming necessary for the operation of these removal programs 78. In fact, it is possible for the custom shell 52 and the malware removal process application 76 to be portions of the same code. Alternatively, the shell 52 can be set up to automatically launch a separate application that contains this programming. Either way, the present invention will next (step 86) configure the boot data so that the system will return to Normal Mode 10 at the next reboot. By reconfiguring the boot data immediately upon restart in Custom Safe Mode 50, the present invention ensures that a user or technician will not be caught in Custom Safe Mode 50 if a problem or error prevents the completion of the present invention process. Next, at step 88, the third-party malware removal applications are run. The results generated by the operation of these removal applications are reported in step 90. The custom shell 52 then triggers a reboot 92, and the computer system 60 then returns to Normal Mode 10.

Detailed Process

Figure 5:
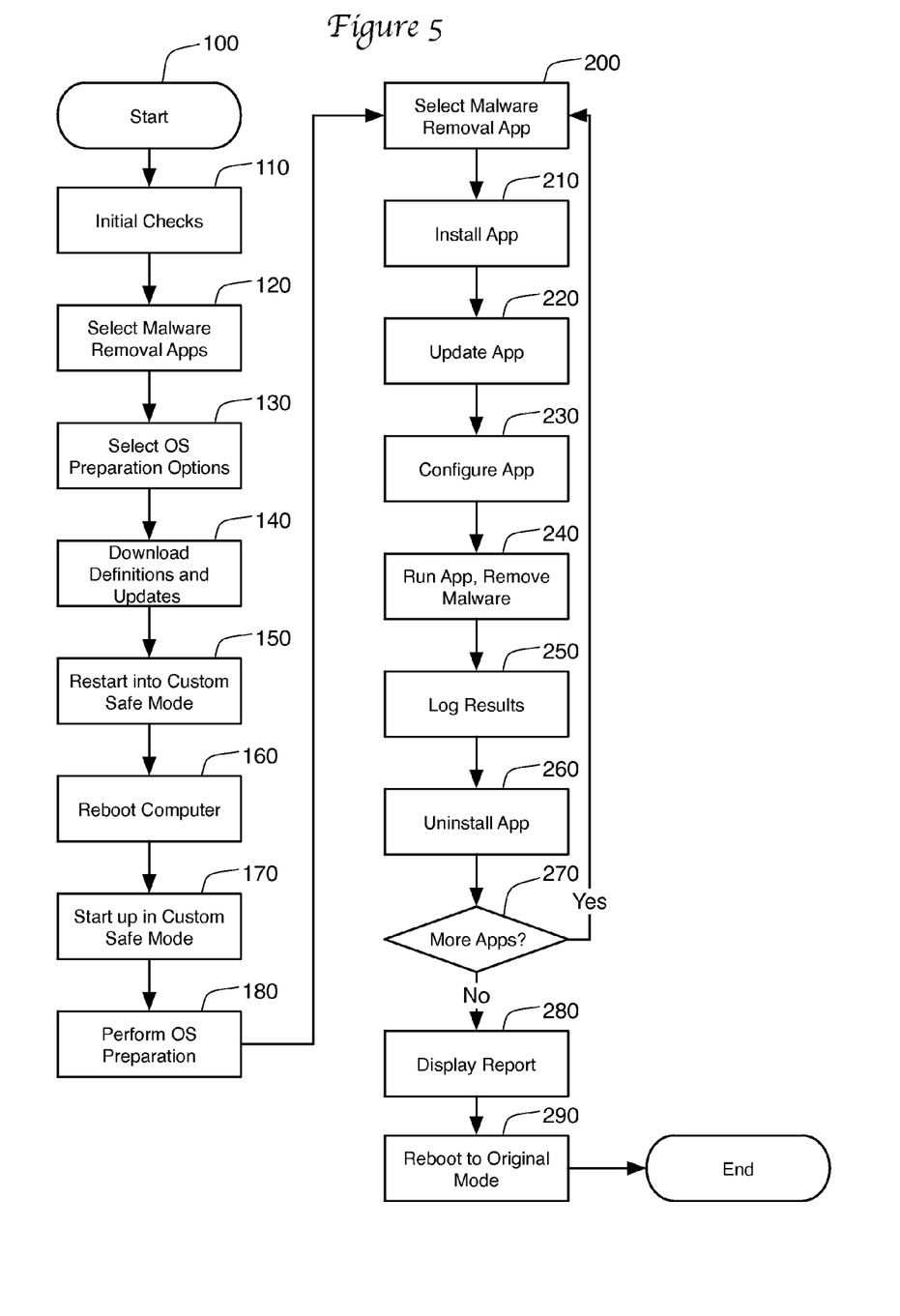
FIG. 5 is a flow chart showing the method of the present invention.

The detailed process 100 used by the present invention in shown in FIG. 5. The process 100 is initiated by a technician or user opening the malware removal process application 76. Most of the following steps occur automatically under the control of application 76 and shell 52 without any user intervention. More specifically, only those steps below that specifically mention user interaction require any user input whatsoever.

Initial Checks. Safe Mode 110

When the application 76 begins, step 110 checks the current boot mode and opens a page with the option to either continue the operation in the current mode or restart the computer in "Custom Safe Mode" after downloads are complete. In most cases where the application 76 is initiated in Normal Mode 10, the technician will select to restart the computer in the Custom Safe Mode 50. In fact, this option can be skipped altogether and the application 76 can assume that the computer system 60 should restart in the Custom Safe Mode 50. In some cases, this step 110 may also present other options to the user, including the ability to cancel the operation of the process and application 76, to check system restore, or to check when the third-party malware definition files were last downloaded to the cache.

Select Malware Removal Apps 120

In the next step 120, the malware removal process application 76 determines the third-party malware removal applications 78 that need to be run. In the preferred embodiment, the user is asked to select from the available applications 78. In addition, the user can be asked whether this application 78 should run a registry only scan or a full scan. Alternatively, the process application 76 can select the plurality of malware removal applications 78 automatically.

Select Operating System Preparation Options 130

This step 130 is performed only if temp files exist or system restore is on. System restore is a component of Windows operating systems that allow for the rolling back of certain system settings in case of problems or errors. If temps exist, this step would prompt the user as to whether the temps should be deleted and then deletes the temps as appropriate. These temp files are capable of containing malicious code. If system restore is on, this step will provide a prompt to initiate backing up the copies of the registry in the restore points before disabling system restore. In addition, this step 130 will provide the user with options or prompts to perform the following functions: turn off system restore (if restore is on), enable termination of any process not on the "white list" of approved processes that are necessary for the functioning of the present invention, and enable MSI service (the Microsoft Windows Installer service)—if already in Safe Mode AND at least one app selected above uses an MSI based installer). The user is also allowed to customize the screen resolution in this step.

Download Definitions and Updates 140

In this step 140, the process application 76 will automatically download updates and definition updates for the selected malware removal applications 78. This download occurs in the Explorer shell 12 because Internet services will not be available in the Custom Safe Mode 50 in which the applications 78 themselves will be operated. The malware updates are stored in a local cache so that multiple copies of the same update/definition file need not be downloaded from the Internet. The items in the cache may be valid for only a short period (such as twelve hours) so that the latest updates are not missed. It is also possible to run crypto fix and do IP/Proxy checking.

Restart Into Safe Mode 150 and Reboot 160

The following sub-steps are performed by the process application 76 to prepare the computer to reboot into the Custom Safe Mode: i) reboot the computer, ii) back up boot.ini file, iii) set attributes of boot.ini file to System-Hidden (so it can be altered), iv) write boot.ini file to default boot to the Custom Safe Mode shell 52 while leaving the old default boot as a secondary option, v) save boot.ini file, vi) set the attributes for boot.ini to System-Hidden-Read-Only, vii) backup the current value (cmd.exe, typically), and viii) write the path to shell 52 to HKLM\ System\ CurrentControlSet\Control\ Safeboot=>"AlternateShell" in the Registry 72. At this point, when the computer system 60 reboots, the system will now boot into "Custom Safe Mode". Consequently, the next step is to initiate system reboot (step 160).

Start up in Custom Safe Mode 170

When the system reboots into the Custom Safe Mode, a startup process in the shell 52 will restore the boot.ini file and HKLM\.\Safeboot key. This allows a second reboot to return the computer into its Normal Mode. In addition, this start up process will read the list of malware applications that are to be run and the preferences/settings set in steps 120-130 from the registry (these values are then deleted).

Perform Operating System Preparation 180

In this step, the present invention automatically (i.e., without user interaction or intervention) performs some preparatory functions, such as deleting temporary files, backing up system restore registry hive backups, disabling System Restore, and enabling MSI Service. In addition, the present invention completes the establishment of the Custom Safe Mode by terminating EVERY process in the system that is not flagged as critical, i.e. found on a white list of allowed processes. In general, this step 180 terminates all processes in Windows XP except system idle, system, winlogon, smss, lsass, csrss, svchost, services.exe, msiexec.exe (if necessary) and the Custom Safe Mode shell 52. These processes will vary depending on the actual operating system used.

Select Malware Removal Application 200

At this point, the present invention will automatically perform the malware removal process by operating the selected malware removal applications 78. For each application 78, the same process is completed. The process begins at step 200, which simple selects a single application 78 for the following steps.

Install Application 210

If the application 78 can "run from CD", the present invention will skip the installation step and simply copy the files to the computer's hard drive 70. Otherwise it will be necessary to install the application 78. To do so, the present invention will first detect any already installed versions of the applications on the computer system 60. If the application 78 is not already installed, the present invention will silently install the software 78. If a silent install is not supported by the application 78, this step 21 will launch a manual installer that requires input by the user.

Ideally, the installation files for applications 78 are found on a removable optical disk that used by the present invention. This disk preferably contains all the information necessary to load the custom shell 52 and the malware removal process application 76 into storage 70 as well as the third-party malware removal applications 78. Of course, to the extent the present invention installs the application 78 from an optical disk, it is vital to ensure that all licensing obligations that are owed to the copyright owner of the application 78 are fulfilled.

This step 210 can detect if the selected application 78 already exists in storage 70, and whether that copy of the application 78 is a trial version or a full version. After making this determination, application installation is handled appropriately. For instance, if a trial version of the selected application 78 is already installed in storage 70, step 210 can reinstall it or install over it. If the present invention cannot definitively determine whether it is a trial version that is installed, all available information is presented to the user, who is then able to determine whether to run the existing version, to install over the existing version, or to skip the application entirely.

Update Application 220

In order to update the application, it is not necessary to download any updates over the Internet since this was accomplished in step 140 with the updates being temporarily stored in a cache found on storage 70. Step 220 copies these latest malware definitions to the directory used by the selected malware removal application 78. If no definitions for this application 78 exist in the cache (which would indicate that no definitions were downloaded in step 140), the present invention checks the optical disc and copies the definitions stored there instead.

Configure Application 230

If a Registry Only scan was desired, the present invention will automatically configure the registry keys / etc that make the application scan only the registry. If a Full Scan was selected, the system will set registry keys to enable maximum scanning power (scan archives, scan for rootkits, etc). Any other tweaks that make for a more optimal scanning experience will also be implemented automatically.

Running Application/Remove Malware 240

At this point, the present invention will open the malware removal application's main executable in step 240. If the application supports switches to automatically begin a scan, those switches will be passed automatically to the application. If that fails, the present invention will use a custom script to press the buttons for each application. If this also fails, the user will have to manually press "Scan." One possibility is to run the application as a service, or run it as the LocalService user account (to give it the ability to get around most permissions). After the application performs its scan, the user chooses what malware items to remove (if any), presses "remove", and closes application.

Log Results 250

The present invention will monitor the computer system 60 waiting for the launched malware removal application 78 to close. Once it does close, the present invention "wakes up" at step 250 and displays a dialog box to the user. This box is pre-populated with the scan time, start and stop times, user account, system restore state, and the user's initials (if they've been input to the application at any previous time). The user must enter the malware traces found/removed, and any comments they may have on the operation of the application 78. These scan results are then stored automatically to the registry.

Uninstall 260

In step 260, the present invention will remove or not remove the malware application 78 from the computer system 60, as appropriate. If the application 78 was run from the optical disk, then the files copied to storage 70 will be deleted. If the application was run by running a copy already on the computer system 60, the application 78 will be left intact. If the application was installed, it will be removed silently. This last option is accomplished either by deleting the application or running the application's uninstaller.

More Applications 270

At step 270, the present invention will determine whether there are any more malware applications 78 that were selected by the user in step 120. If so, the next malware application 78 will be selected at step 200, and steps 210-260 will be repeated. If not, the method 100 will go on to step 280.

Display Report 280

When all malware applications have been run, the present invention will display all the results stored in the multiple iterations of step 250 as a report of the entire process. This report can be stored to the hard drive for later reporting after rebooting out of the Custom Safe Mode.

Reboot to Original Mode 290

At this point, the original boot.ini will already have been restored (in step 180). Consequently, the computer system 60 will reboot and return to the original Normal Mode 10 of the computer.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A computerized method for removing malware from a non-volatile storage of a computer, the non-volatile storage containing an infected operating system having a normal shell and a second shell, the computerized method comprising:
   a) initiating a malware removal process application while in the normal shell of the infected operating system, the malware removal process application causing the computer to reboot into the second shell; and
   b) the second shell of the infected operating system performing the following steps after reboot:
      i) for each of a plurality of malware removal applications:
         (1) installing the malware removal application onto the non-volatile storage on the computer,
         (2) running the malware removal application in the second shell, the malware removal application removing the malware infecting the infected operating system, and
         (3) uninstalling the malware removal application from the non-volatile storage on the computer, and
      ii) rebooting the computer back into the normal shell of the previously infected operating system.

2. The computerized method of claim 1, wherein the step of rebooting the computer into the second shell further comprises:
   (1) backing up boot configuration data;
   (2) altering the boot configuration data so as to cause the computer to reboot into the second shell;
   (3) causing the computer to reboot; and
   further wherein upon startup the second shell automatically restores the boot configuration data to its backed up condition.

3. The computerized method of claim 2, wherein a single non-volatile storage device contains both the normal shell of the infected operating system and the second shell of the infected operating system, and further wherein the malware removal applications are installed on the single non-volatile storage device.

4. The computerized method of claim 2, wherein the step of rebooting the computer further comprises storing the path to the second shell in the computer's registry.

5. The computerized method of claim 4, wherein a current path for a standard safe boot shell in the computer's registry is temporarily stored before the path for the second shell is stored in the same place in the registry, and further wherein the temporarily stored path is restored to the computer's registry after the computer is rebooted into the second shell.

6. The computerized method of claim 1, wherein the plurality of malware removal applications are selected from a set of available applications, wherein each of the available applications are stored on the removable computer readable medium.

7. The computerized method of claim 6, wherein the plurality of malware removal applications are selected through a user interface provided during operation of the normal shell.

8. The computerized method of claim 1, further comprising a step of terminating a plurality of non-critical processes that further comprises comparing all processes running on the computer with a white list of allowed processes and terminating all processes not on the white list of allowed processes.

9. The computerized method of claim 1, wherein each malware removal application is installed from a removable computer readable medium onto non-volatile storage on the computer when the malware removal application was not previously installed onto the non-volatile storage of the computer, wherein the method operates a previously installed malware removal application when the malware removal application was previously installed onto the non-volatile storage of the computer, and further wherein the previously installed malware removal application is not thereafter uninstalled.

10. The computerized method of claim 1, wherein the step of installing the malware removal application from a removable computer readable medium onto non-volatile storage on the computer further comprises the sub-step of determining whether the malware removal application is already installed on the non-volatile storage of the computer and, if so, installing a different version of the malware removal application from the removable computer readable medium over the installed version of the malware removal application, further wherein the installed version is not thereafter uninstalled.

11. The computerized method of claim 1, wherein the second shell is stored on the non-volatile storage of the computer system under a filename that is different than all of the shells provided as a part of the operating system running on the computer including the normal shell.

12. The computerized method of claim 1, wherein step b) is automated without user interaction with the computer after reboot into the second shell.

13. The computerized method of claim 1, wherein the normal shell operates a network interface to connect to the Internet and the second shell lacks a network interface, wherein step a) further comprises downloading updates from the Internet to the plurality of malware removal applications, and wherein step b) further comprises updating the malware removal application after installing the malware removal application using the updates downloaded in the normal shell.

14. A computer product, comprising:
a non-transitory computer readable medium having a computer program code embodied therein, said computer program code adapted to be executed to remove malware from an infected operating system shell, the computer readable medium comprising:
 a) a plurality of malware removal applications existing as programming on the removable computer readable medium;
 b) programming to cause the computer operating in a normal shell of the invented operating system to reboot into the second shell of the infected operating system;
 c) programming to cause the computer, after rebooting into a second shell, to perform the following steps for each of the plurality of malware removal software applications:
  i) install the malware removal software application from the non-transitory computer readable medium onto a second computer memory device,
  ii) run the installed version of the malware removal software application from the second computer memory device, the malware removal application removing malware infecting the infected operating system, and
  iii) uninstall the malware removal software application from the second computer memory device.

15. The computer system of claim 14, wherein the non-transitory computer readable medium is removable from the computer.

16. The computer system of claim 14, wherein programming constituting the second shell is stored on the non-transitory computer readable medium and is installed onto the second computer memory device before rebooting into the second shell, and is later uninstalled from the second computer memory device.

* * * * *